United States Patent [19]

Rovnyak

[11] 4,166,930
[45] Sep. 4, 1979

[54] TRANSIENT FREE RING RELAY CIRCUIT FOR ARBITRARY TIME SWITCHING

[75] Inventor: Richard M. Rovnyak, Schaumburg, Ill.

[73] Assignee: GTE Automatic Electric Laboratories Incorporated, Northlake, Ill.

[21] Appl. No.: 879,976

[22] Filed: Feb. 22, 1978

[51] Int. Cl.² ............................................. H04M 3/04
[52] U.S. Cl. .............................. 179/18 HB; 179/84 R
[58] Field of Search .......... 179/18 HB, 18 F, 18 FA, 179/84 R, 84 A; 307/135; 200/144 R

[56] References Cited
U.S. PATENT DOCUMENTS 4,071,709   1/1978   Lee et al. ........................ 179/84 R Primary Examiner—Kathleen H. Claffy
Assistant Examiner—Joseph A. Popek
Attorney, Agent, or Firm—Robert J. Black; Gregory G. Hendricks

[57] ABSTRACT

A circuit which connects a ringing voltage generator to a telephone subscriber loop without allowing harmful, electrical transient discharges to develop. Relay contacts are used to switch current limiting resistors into the loop circuit and ringing voltage generator circuit to limit transients during transfer of the ringing voltage generator to or from the subscriber loop circuit. These current limiting resistors are then switched out of the loop when the transients have dissipated.

8 Claims, 1 Drawing Figure

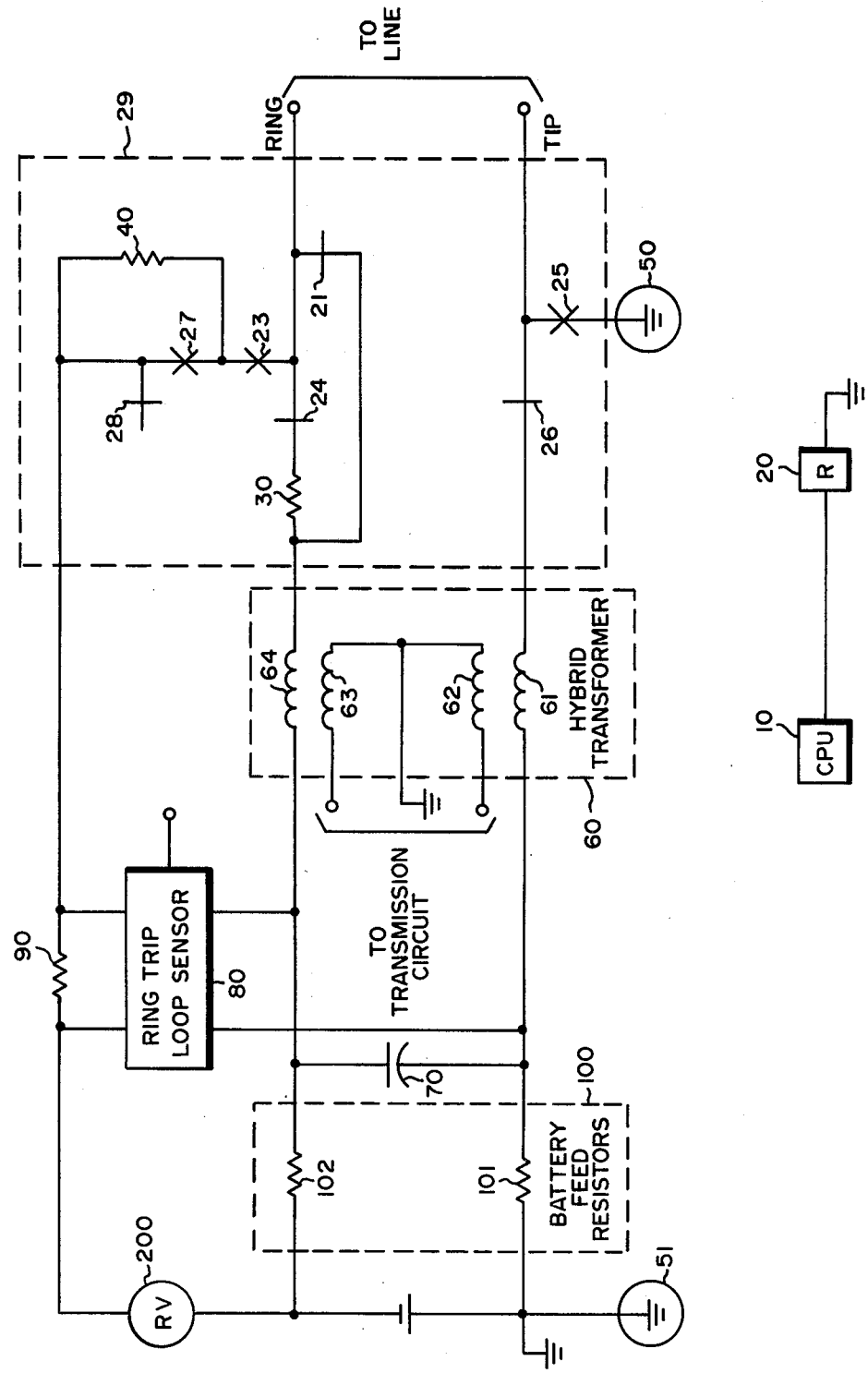

TRANSIENT FREE RING RELAY CIRCUIT FOR ARBITRARY TIME SWITCHING

BACKGROUND OF THE INVENTION

1. Field of the Invention

The present invention relates to telephone subscriber supervisory circuits and more particularly to a circuit for connecting and disconnecting a ringing voltage generator to a telephone subscriber loop without allowing harmful transient discharges to develop.

2. Description of the Prior Art

When a telephone subscriber's loop circuit is switched between a DC transmission source and an AC ringing voltage generator, substantial transients are typically generated by the interruption of these circuits, which are inductive in nature. These transients are particularly harmful in digital network telephone offices.

This problem has traditionally been solved by resistor/capacitor networks or other types of contact suppression circuits. A contemporary approach has been to coordinate sophisticated electronic instantaneous line state sensing or preconditioning schemes with the transfer of the ringing voltage generator to and from the subscriber's loop, as disclosed in U.S. Pat. No. 4,071,709 to D. Q. Lee, et al. However, these methods all incur substantial penalty in the form of cost, size, and/or limitations on system performance.

Accordingly, it is an object of the present invention to provide a low cost, maintenance free technique of switching the telephone subscriber's loop between a DC transmission source and an AC ringing voltage generator without generating harmful electrical transients.

SUMMARY OF THE INVENTION

The present invention is a circuit which transfers the subscriber's loop circuit between the DC transmission source and AC ringing voltage generator without generating harmful electrical transients. This circuit is typically part of the line equipment of a telephone central office.

This circuit consists of a ring relay operated and released by a central processor to apply and remove ringing current to the telephone subscriber's loop circuit, including a break contact across a current limiting resistor in the ring lead of the subscriber's loop, a make contact across a current limiting resistor in series with the ring lead and ringing voltage generator, a first set of make-before-break contacts with the break contact in the tip lead and the make contact in series with the tip lead and ringing voltage ground, and a second set of make-before-break contacts with the break contact in the ring lead and the make contact in series with the ring lead and the ringing voltage generator.

When the ring relay is operated to apply ringing current to the subscriber's loop circuit, the break contact of the ring relay in a shunt path around the current limiting resistor in the ring lead, operates to remove the shunt path around that resistor to protect the transmission circuit from electrical transients fed back by the ringing voltage generator. Then the make contacts of both make-before-break contact sets operate to connect the tip lead to ground and the ring lead to the ringing voltage generator in series with the second current limiting resistor. Next, the break contacts of these make-before-break contact sets operate to disconnect the transmission circuit from the subscriber's loop circuit. Finally the make contact in the shunt path across the resistor in series with the ringing voltage generator operates so that full ringing current is applied to the subscriber's loop circuit.

When transferring the subscriber's loop circuit from ringing voltage generator back to the transmission circuit the ring relay is released by the central processor and the contacts operate in the reverse order. Therefore, the ring relay connects current limiting resistors in both the transmission circuit and ringing voltage generator lead which protect the transmission circuit from any electrical transients during switching, by limiting the amount of current that can flow in said transmission circuit during switching. The current limiting resistor is then switched out of the transmission circuit when switching is complete so full transmission power can again be applied to the subscriber's loop circuit.

DESCRIPTION OF THE DRAWING

The single FIGURE of the accompanying drawing is a schematic diagram of a transient free ring relay circuit for arbitrary time switching in accordance with the present invention.

DESCRIPTION OF THE PREFERRED EMBODIMENT

Referring now to the accompanying drawing, the transient free ring relay circuit of the present invention is shown.

The tip lead of the subscriber loop circuit is connected to ground and the ring lead of the subscriber loop is connected to battery.

This circuit includes ring relay 20 connected to the switching system central processor 10, current limiting resistor 30 connected in series in the ring lead, break contact 24 also connected in series in the ring lead, break contact 21 connected in shunt across resistor 30 and break contact 24, break contact 26 connected in series in the tip lead, make contact 25 connected between the tip lead and ringing voltage ground 50, make contact 23 connected between the ring lead and current limiting resistor 40, which in turn is connected to ringing voltage generator 200 via resistor 90. Make contact 27 is connected in a shunt path across resistor 40.

When the Central Processing Unit 10 determines that a telephone subscriber's phone is to be rung, it operates ring relay 20. Associated break contact 21 is operated, make contact 23 is operated as part of a make-before-break contact set and make contact 25 is also operated as part of a make-before-break contact set. Therefore, when ringing relay 20 is operated break contact 21 removes the shunt around current limiting resistor 30 which causes this resistor to be connected in series in the ring lead to protect the transmission circuit connected to hybrid transformer 60 from any electrical transients generated during switching of the ringing voltage generator. Make contact 23 then connects the ringing voltage generator 200 to the subscriber's loop circuit via current limiting resistor 40, and make contact 25 connects the subscriber's loop circuit to ringing generator ground 50.

The second stage or step of contact operation includes make contact 27 because it is part of a break-before-make contact set (it should be noted that break contact 28 is not used, the combination being employed for timing purposes only, and alternatively a late make contact set could be used); break contact 24 which is operated as part of a make-before-break contact set and break contact 26 which is operated as part of a make-before-break contact set. When break contacts 24 and 26 operate, they disconnect the transmission circuit from the subscriber's loop circuit and ringing current is supplied only to the subscriber loop circuit via current limiting resistor 40. Make contact 27 when operated provides a shunt path around resistor 40. In this configuration full ringing current is supplied to the subscriber's telephone and electrical transients have been eliminated through the use of current limiting resistors during switching.

When the Central Processing Unit 10 removes ringing current from the subscriber's loop, ringing relay 20 is released causing make contact 27 to release which connects current limiting resistor 40 into the ringing path. Then break contacts 24 and 26 release connecting the transmission circuit to the subscriber's loop circuit via current limiting resistor 30. Next make contacts 23 and 25 release, disconnecting the ringing voltage generator 200 and ringing voltage ground 50 from the subscriber's loop circuit. Finally, break contact 21 releases providing the shunt path around current limiting resistor 30 to connect the transmission circuit directly to the subscriber's loop circuit.

The transient free ring relay switching circuit of the present invention allows the ringing voltage generator to be connected to and disconnected from the subscriber's loop circuit at arbitrary times because the ring relay contacts are arranged such that current limiting resistors are switched into both the subscriber's circuit loop and ringing voltage generator circuit during switching of the ringing voltage generator to prevent any unexpected harmful ringing current signals from reaching the transmission circuit. These current limiting resistors are then removed when switching is complete. Therefore, no harmful electrical transients are developed and the ringing voltage generator can be switched in and out of the subscriber's loop circuit at arbitrary times. This assumes that relay contacts 23, 24 and 27 will operate as designed. But even if transients are generated by imperfect contact behavior, resistor 30 will limit such currents to a safe value.

It will be obvious to those skilled in the art that numerous modifications of the present invention can be made without departing from the spirit of the invention which shall be limited only by the scope of the claims appended hereto.

What is claimed is:

1. A ring relay circuit for use in a telephone switching system, said switching system including a central processing unit, a transmission circuit, a ringing signal source and a line connecting said switching system to a subscriber station, said relay circuit comprising:
   switching control means connected to said central processing unit;
   first and second switching means each associated with and operable in response to energization of said switching control means;
   said first switching means normally connecting said line to said transmission circuit and operable to connect said ringing signal source to said line;
   first current limiting means included in said connection between said line and said transmission circuit; and
   said second switching means normally providing a shunt around said first current limiting means;
   said switching control means energized in response to said central processing unit to operate said first switching means, to initially connect said line to said ringing signal source, and to further disconnect said line from said transmission circuit, and to operate said second switching means to discconect said shunt arround said first current limiting means, whereby the flow of current from said ringing signal source to said transmission circuit is limited and harmful transients are inhibited.

2. A ring relay circuit as claimed in claim 1, wherein there is further included: second current limiting means included in said connection between said line and said ringing signal source; and
   third switching means connectable in shunt around said second current limiting means associated with and operated in response to said energization of said switching control means by said central processing unit to shunt said second current limiting means, whereby full ringing signal power is provided to said line.

3. A ring relay circuit as claimed in claim 1, wherein: said switching control means comprise a relay coil.

4. A ring relay circuit as claimed in claim 1, wherein: said first current limiting means comprise a resistor.

5. A ring relay circuit as claimed in claim 2, wherein: said second current limiting means comprise a resistor.

6. A ring relay circuit as claimed in claim 1, wherein: said first switching means comprise two sets of make-before-break relay contacts.

7. A ring relay circuit as claimed in claim 1, wherein: said second switching means comprise a set of break type relay contacts.

8. A ring relay circuit as claimed in claim 2, wherein: said third switching means comprise a set of make type relay contacts included in and part of a set of break-before-make contacts.

* * * * *